Oct. 29, 1963    B. M. JAMISON, JR    3,108,858
CARBON BLACK PRODUCTION AND RECOVERY DEVICE
Filed Aug. 14, 1961    5 Sheets-Sheet 1

Bert M. Jamison, Jr.
INVENTOR.

BY Ranulen O. Wyatt
ATTORNEY

Oct. 29, 1963  B. M. JAMISON, JR  3,108,858
CARBON BLACK PRODUCTION AND RECOVERY DEVICE
Filed Aug. 14, 1961  5 Sheets-Sheet 2

Bert M. Jamison
INVENTOR.

BY Pamela O. Wyatt
ATTORNEY

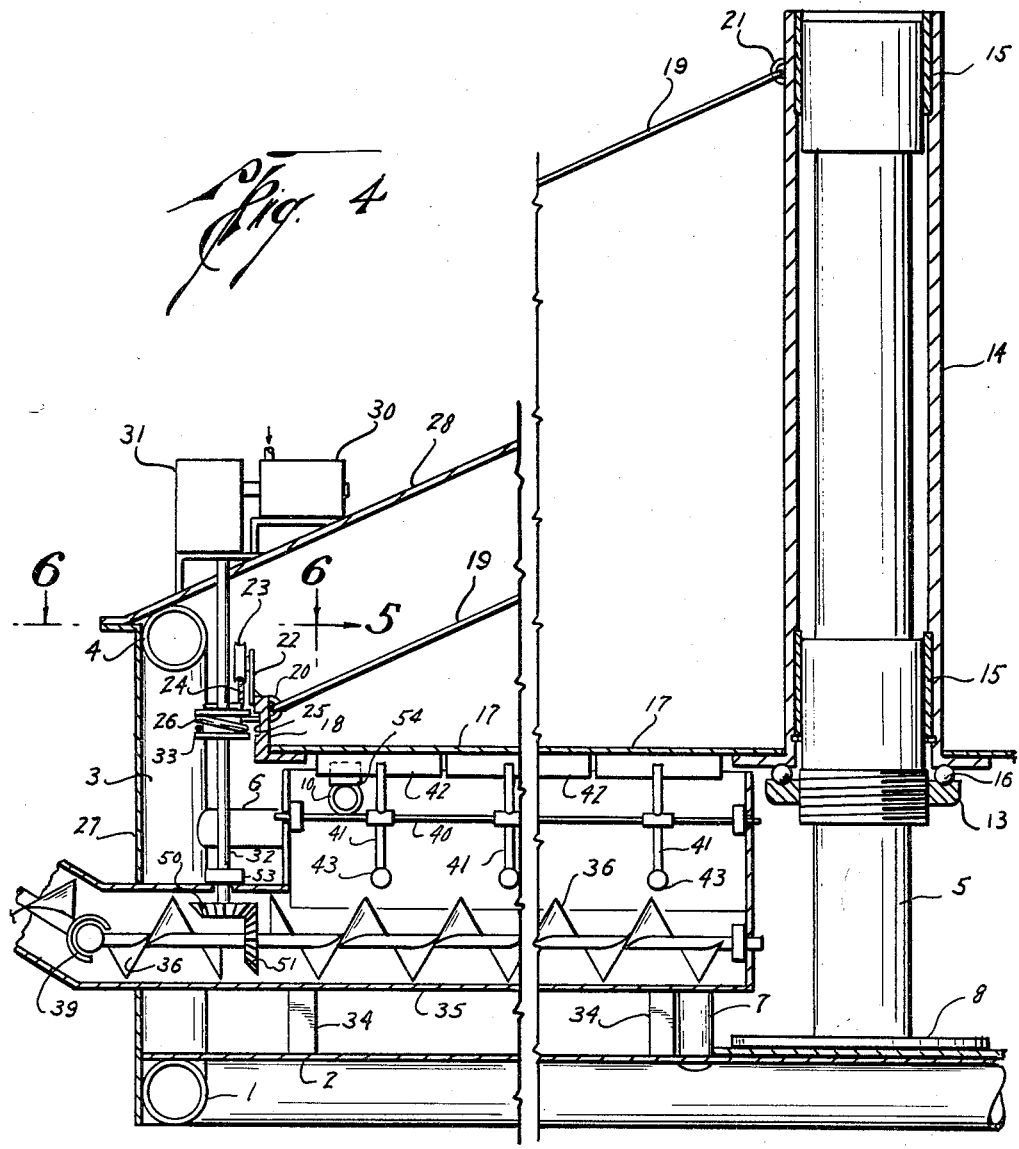

Oct. 29, 1963  B. M. JAMISON, JR  3,108,858
CARBON BLACK PRODUCTION AND RECOVERY DEVICE
Filed Aug. 14, 1961  5 Sheets-Sheet 4
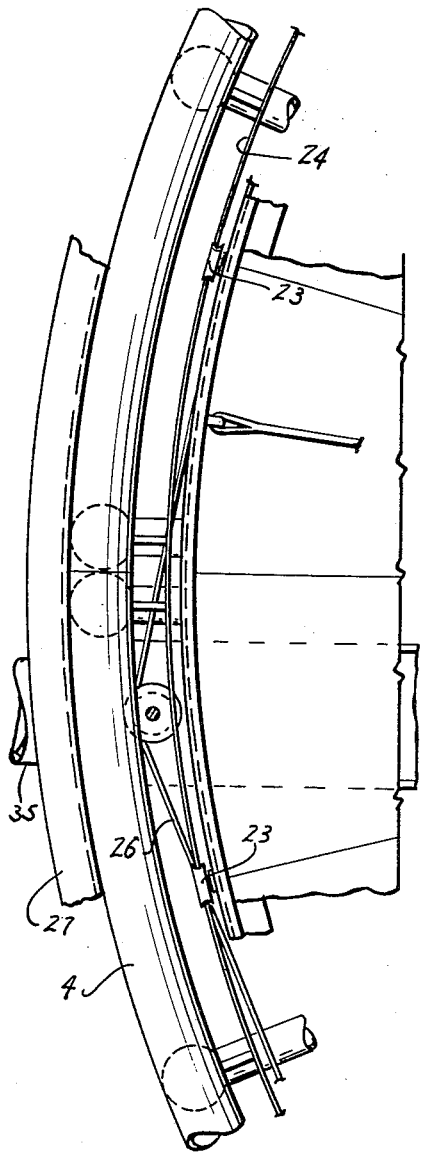
Fig. 6
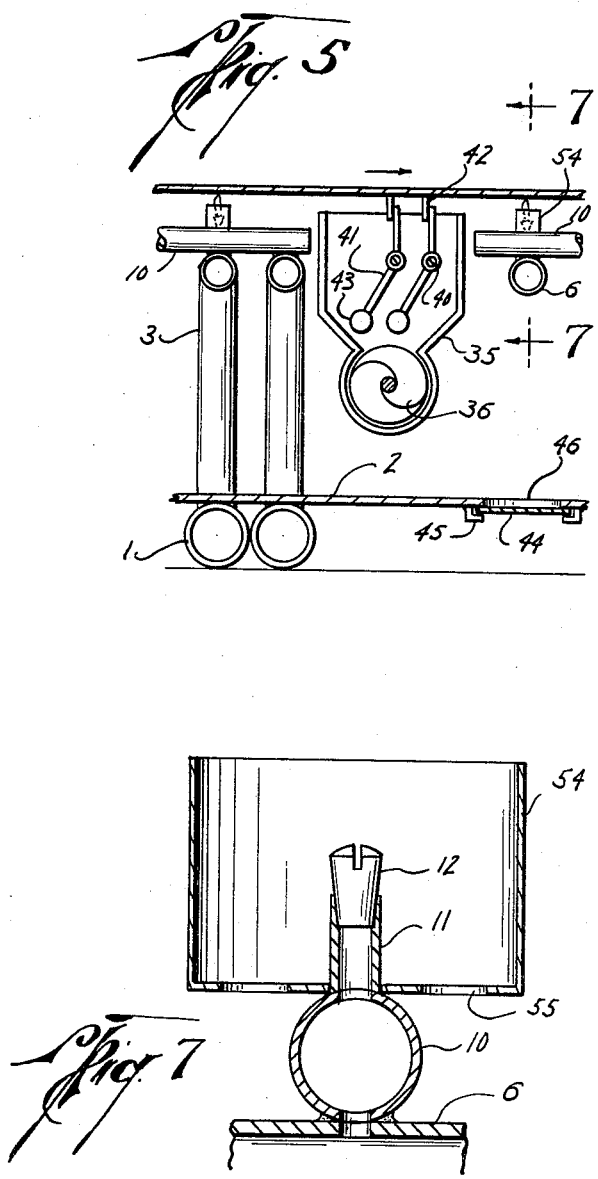
Fig. 5
Fig. 7
Bert M. Jamison
INVENTOR.
BY Ranseler O. Wyatt
ATTORNEY Oct. 29, 1963 B. M. JAMISON, JR 3,108,858
CARBON BLACK PRODUCTION AND RECOVERY DEVICE
Filed Aug. 14, 1961 5 Sheets-Sheet 5
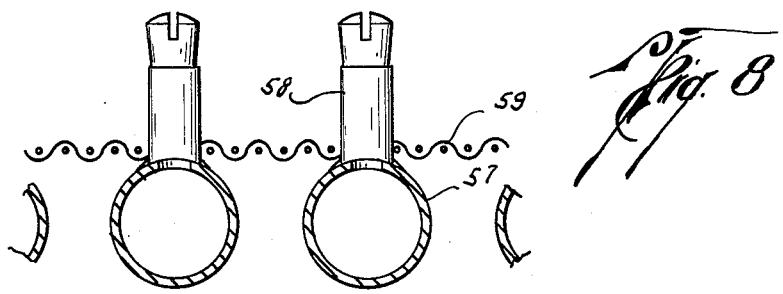
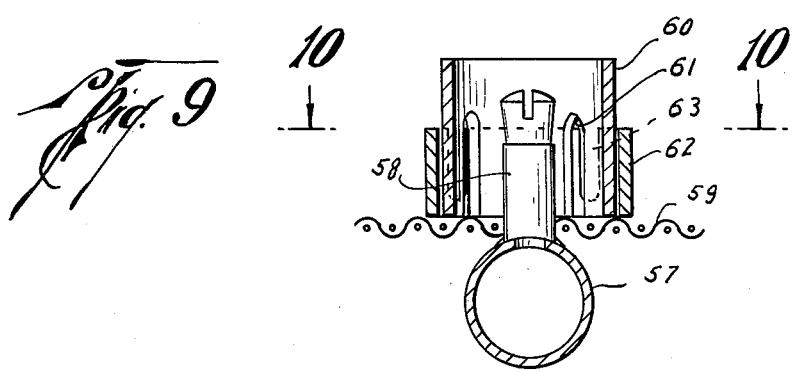
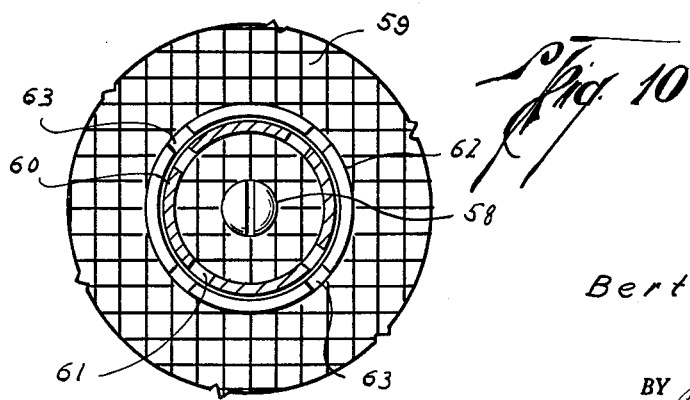
Bert M. Jamison
INVENTOR.
BY Pamela O. Wyatt
ATTORNEY

United States Patent Office 3,108,858
Patented Oct. 29, 1963

3,108,858
CARBON BLACK PRODUCTION AND
RECOVERY DEVICE
Bert M. Jamison, Jr., 1903 University Blvd.,
Houston, Tex.
Filed Aug. 14, 1961, Ser. No. 131,191
9 Claims. (Cl. 23—259.8)

This invention relates to new and useful improvements in a carbon black recovery device.

It is an object of this invention to provide a device for producing carbon black having novel means for producing and recovering carbon black.

In the petroleum industry, there are many instances where gas is wasted or, although discovered, can not be profitably produced for such reasons as lack of pipe line facilities to a market. In such instances the gas is of no value and must be either flared or left in the formation. It is an object of this invention to provide a means for converting the gas into carbon black in the field adjacent the producing well or wells.

It is another object of the invention to provide a carbon black producing and recovery device having novel means for providing multiple burners and supplying said burners with an adequate amount of gas as well as air for efficient combustion.

It is another object of the invention to provide a carbon black producing and recovery device having novel means for removing the carbon black from rotating depositories.

It is another object of the invention to provide a carbon black production and recovery device having novel burners providing easy and efficient means of controlling the ratio of air-gas feed to the burners.

It is another object of the invention to provide a carbon black production and recovery device that may be portable and quickly installed singly or in multiples, and that may be completely housed with novel means for controlling the flow of air into the housing when in production.

With the above and other objects in view, the invention has relation to certain novel features of construction, operation and arrangement of parts more particularly defined in the following specifications and illustrated in the accompanying drawings, wherein:

FIGURE 4 is a fragmentary cross sectional side elevational view, illustrating the recovery means employed.

FIGURE 5 is an enlarged cross sectional view taken on the line 5—5 of FIGURE 4.

FIGURE 6 is a fragmentary cross sectional top view taken on the line 6—6 of FIGURE 4.

FIGURE 7 is an enlarged side elevational cross sectional view of a burner, taken on the line 7—7 of FIGURE 5.

FIGURE 8 is an enlarged fragmentary view of the burner and gas supply.

FIGURE 9 is an enlarged cross sectional view of the air control means employed to feed air to the burner.

FIGURE 10 is a top plan view, in cross section, of the burner and air control taken on the line 10—10 of FIGURE 9.

Figure 1:
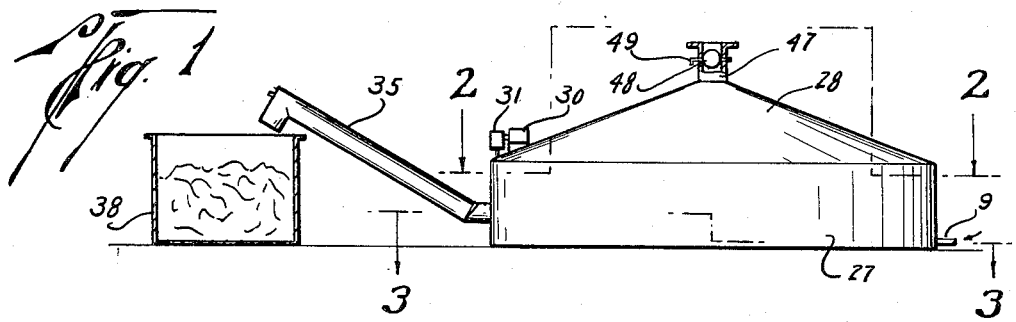
FIGURE 1 is a side elevational view of the device.
Figure 2:
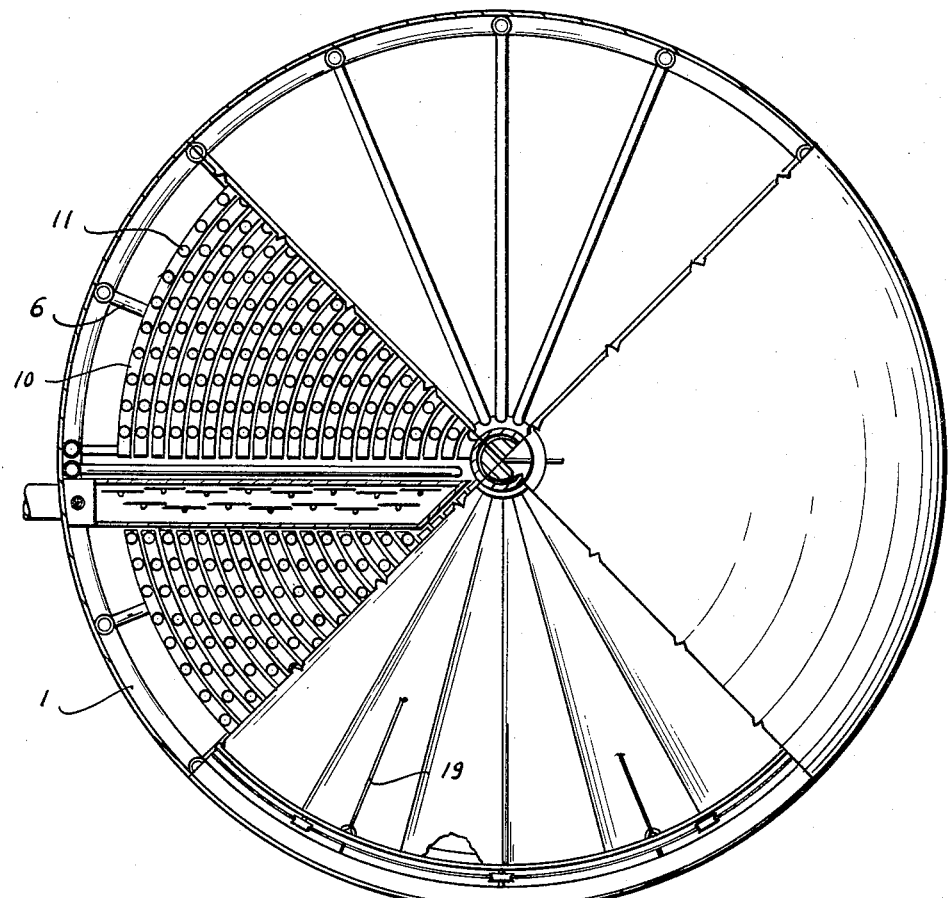
FIGURE 2 is an enlarged fragmentary view, partly in cross section, taken on the line 2—2 of FIGURE 1.
Figure 3:
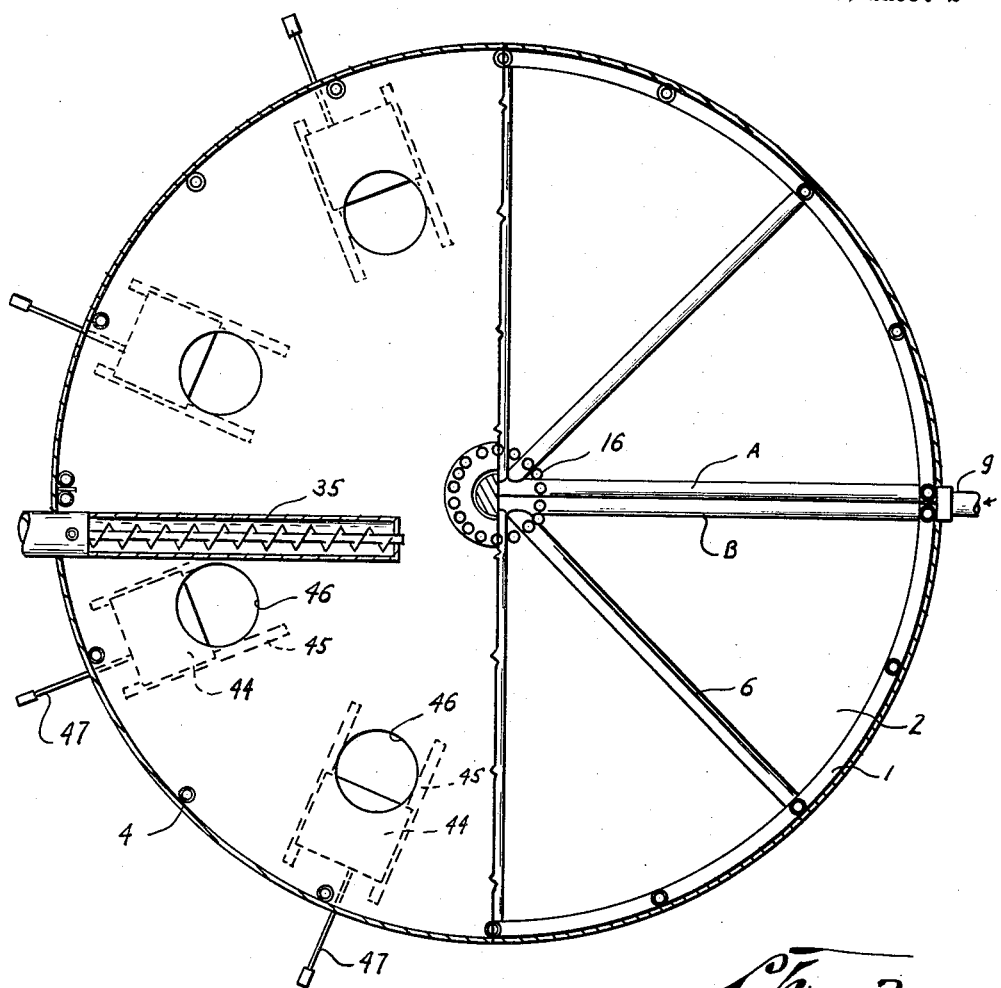
FIGURE 3 is a fragmentary top plan view, in cross section, taken on the line 3—3 of FIGURE 1.

Referring now more particularly to the drawings, the numeral 1 designates a lower section of tubular material on which a series of lower plates 2, 2 are mounted. Vertical tubular supports 3, 3 are mounted on and are in tubular connection with the lower section 1 and an upper section of tubular material 4 is mounted on and tubularly connected with the vertical supports 3, 3, forming a half circle frame A. A similar frame B is formed, and the frameworks joined to form a circular structure. A center post 5 is mounted on the bottom plates 2, 2 of the joined frames and a series of conduits 6, 6 are tubularly connected to the vertical supports 3, 3 in each frame and extend radially from and are tubularly connected with the inner vertical tubular members 7, which are spaced around the center post supporting plates 8, 8. The tubular members 1, 3, 4, 6 and 7 form a conduit system in each frame into which a flow of gas may be directed. The circular unit thus formed in two independent parts, A and B, receive a flow of gas into their respective conduit systems through the common inlet 9 when the parts are joined.

Mounted on the member 6 in each frame and tubularly connected therewith are the annular supply conduits 10, 10, which are concentric with the center post 5 when the parts are joined and on which the burners 11, 11 are mounted. Suitable burner tips 64 are seated in the upper ends of the burners 11.

Mounted on the center post 5 is an externally threaded sleeve 12 on which the annular center post sleeve support 13 is adjustably mounted. The center post sleeve 14 is rotatably mounted on the center post 5 and a pair of bushings as 15, 15 maintain the center post sleeve 14 in vertical alignment with the post 5 and suitable ball bearings 16 mounted between the support 13 and sleeve 14 permit easy rotation of the sleeve 14.

The sleeve 14 is outwardly flanged at its lower end and supports one end of the plates 17, 17 upon which the carbon black is collected and which are triangular in shape and fit closely together to form the circular collection plate when the parts A and B are joined. An angle iron rim 18 forms a support for the other ends of the collection plates 17, 17, and is suspended from the center post sleeve by means of cables, as 19, which are mounted at one end to the cable eyes 20 on the rim 18 and to cable eyes as 21 on the center post sleeve 14. These cables may be provided with turn buckles (not shown) for adjustment, and are spaced around the center post sleeve at intervals to provide a balanced load. Mounted on the upper end of the rim 18 at spaced intervals are the guide roller supports 22 on which the vertically adjustable guide rollers 23 are rotatably mounted. An anchored guide rail 24 is secured to the vertical members 3, 3 and provides a track for the rollers 23. The outer side wall of the rim 18 is grooved as at 25 to provide a seat for the rotating cable 26.

The entire unit, when joined, is inclosed by means of the bottom plates 2 on each frame, the side plates 27 around the outer side wall of each frame and the top plates 28 on each frame, so that when the frames A and B are joined, the inclosure is complete. Mounted on the top plates 28 is a suitable air motor 30 and gear box 31, on one of the frames, and a drive shaft 32 extends downwardly through the top plates 28 from the gear box 30 and a vertically adjustable pulley 33 is mounted on the shaft 32 on which the rotating cable 26 is wound to impart rotation from the driveshaft 32 to the rim 18.

Mounted beneath the collecting plates 17 and supported by the legs 34, 34 in one of the frames is the auger housing 35 in which the rotatable auger 36 is mounted. The housing 35 extends outwardly through the side plates 27 and upwardly to a suitable collecting tank 38 and a suitable ing 35 extends outwardly through the side plates 27 and upwardly to a suitable collecting tank 38 and a suitable swivel joint 39 in the auger 36 provides means for continuing the movement of collected carbon black from the housing 35 to the tank 38. The housing 35 is enlarged over the area directly beneath the plates 17 and the upper end of the enlarged portion is open. A pair of scraper plate shafts 40, 40 are mounted in the open end of the housing 35 and a series of pivotal scraper plate arms 41, 41 are mounted on the shafts 40, 40. On the upper end of the arms 41 are the longitudinal scraper blades 42 which bear against the underside of the collecting plates 17. The lower ends of the arms 41 are inwardly inclined forming crank arms and are provided with suitable weights 43, 43 to provide the desired contact of the scraper blades with the collecting plates.

Spaced at desired intervals in the bottom plates 2 of each frame are suitable air inlet dampers 44 which are slidably mounted in the tracks 45, 45 and which have the outwardly extending handles 47, 47. Ports 46 in the plates 2 permit air to flow into the area beneath the plates 17 and the dampers 44, 44 may be manually adjusted to control this flow of air.

The top plates 28 of each frame are inclined upwardly and inwardly and terminate against the common vent 47. A damper 48 is mounted in the vent 47 and a manually adjustable control is provided by the projecting handle 49.

On the lower end of the drive shaft 32 is a suitable gear 50 which is in mesh with the gear 51 on the auger 36. The drive shaft 32 extends through a suitable bearing 53 adjacent the housing 35.

Each burner 11 is provided with an inclosure 54 having ports 55 in the bottom thereof for the flow of air to the burner. Another form of burner is shown in FIGURES 8, 9 and 10, where the annular conduits 57 have the burners 58 mounted thereon and tubular connection is established therewith, and which extend upwardly through a perforated support such as a layer of expanded metal 59. An inclosure 60 is seated on the expanded metal 59 and is provided with a series of vertical elongated ports 61, 61. An annular shield 62 is mounted on the expanded metal 59 around the inclosure 60 and is provided with elongated slots 63. The inclosure 60 may be rotated to bring the ports 61 into alignment with the slots 63, or such alignment as is desired, to control the flow of air to the burner 58.

In operation, the device may be conveniently transported to the place of operation by disassembly into the two half circular frames A and B, the top plates 28, the center post assembly consisting of the center post 5, bushings 15 and sleeve 14, and the support 13, and the ventilator 47. When the location of operation is reached, the device is reassembled and the gas supply fed into the inlet 9 and the burners ignited. The distance of the collection plates 17 from the top of the burners 11 is set by rotation of the support 13 which will elevate or lower the sleeve 4 and the plates 17. The plates 17 are leveled by means of the cables 19 after the support 13 has been set. The amount of air to be admitted into the area beneath the burners is determined by adjusting the dampers 44 in the lower plates 2 and the motor 30 is started, rotating the shaft 32, which in turn rotates the rim 18 through the cable 26, and rotating the auger 36 through the gears 50, 51. As the gas burns, carbon black will be deposited on the bottom of the plates 17 and as the plates 17 pass over the scrapers 42, the carbon black will be scraped off of the plates 17 and will drop into the housing 35 where it will be carried by the auger 36 into the depository 38. The scrapers 42 are preferably in two rows, with the rearmost row overlapping the forwardmost row so that the entire plate area will be scraped.

Figure 11:
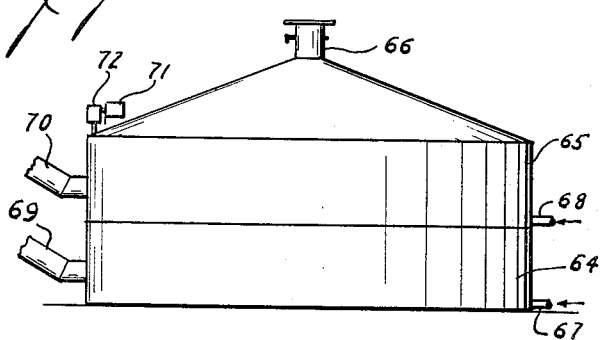
FIGURE 11 is a side elevational view of a multiple recovery structure.

If the volume of gas to be burned is greater than the capacity of a single device, the device may be duplicated and stacked as illustrated in FIGURE 11, the lowermost unit 64 being identical to that above described with the omssion of the top plates 28 and the upper unit 65 being mounted on the lower unit, the drive shaft 32 shown in FIGURE 4 being extended to accommodate both units and the vent 66 providing ventilation for both units. In such arrangement, only the lowermost unit would be provided with lower plates and the damper control for both units would be controlled in the lower unit. An independent feed inlet as 67 and 68 would be provided for each unit and an independent conveyor assembly 69 and 70 being provided for each unit, the motor 71 and gear box 72 being common to both units.

While the foregoing are considered preferred forms of the invention, they are by way of illustration only, the broad principle of the invention being defined by the appended claims.

What I claim is:

1. In a carbon black recovery device, a tubular framework forming an interconnected conduit system, a gas supply line leading into said framework, a ventilated housing around said framework, a series of annular conduits tubularly connected to said framework, burners mounted on and connected into said annular conduits, a rotatable collecting plate above said burners, rotating means in contact with said plate, scrapers beneath said collecting plate and in yieldable contact therewith, receiving means beneath said scrapers and means for transporting carbon black deposited in said receiving means into a depository.

2. In a carbon black recovery device, a tubular framework forming an interconnected conduit system, a gas supply line leading into said framework, a ventilated housing around said framework, a series of annular conduits tubularly connected to said framework, burners mounted on and connected into said annular conduits, an air barrier around each of said burners, means for selectively determining the flow of air to said burners through said barrier, a rotatable collecting plate above said burners, means for rotating said plate, scrapers beneath said collecting plate and in yieldable contact therewith, a receiving housing beneath said scrapers and means for transporting carbon black deposited in said housing into a depository.

3. In a carbon black recovery device, a pair of framework sections formed in half circles and adapted to be joined into a circular framework, a gas supply line leading into said framework, a housing around said circular framework, said circular framework having each section tubular and interconnected to form a conduit system therein, dampers in the bottom of said housing for selectively controlling the flow of air into said housing, a center post in said housing, a rotatable sleeve mounted on said center post, a collection plate supported by said sleeve, means for rotating said collection plate, burners mounted in said conduit system and in flow connection therewith beneath said collection plate, counter-balanced scrapers yieldably in contact with the bottom of said collection plate and means for transporting carbon black removed from said collection plate as said plate rotates over said scrapers to a depository.

4. In a carbon black recovery device, a pair of framework sections formed in half circles and adapted to be joined into a circular framework, a gas supply line leading into said framework, a housing around said circular framework, said circular framework being tubular and interconnected to form a gas conduit system in each section, manually operable dampers for selectively controlling the flow of air into said housing, a center post in said housing, a rotatable and vertically adjustable sleeve mounted on said center post, a collection plate supported by said sleeve, burners mounted in said conduit system and in flow connection therewith beneath said collection plate, means for controlling the flow of air to said burners, radial overlapping rows of counter-balanced scrapers yieldably in contact with the bottom of said collection plate and means for transporting carbon black removed from said collection plate as said plate rotates over said scrapers to a depository.

5. In a carbon black recovery device, a pair of framework sections formed in half circles and adapted to be joined into a circular framework, a gas supply line leading into said framework, a housing around said circular framework, said circular framework sections being tubular and interconnected to form a gas conduit system, means for selectively controlling the flow of air into said housing, a center post in said housing, a rotatable sleeve mounted on said center post, means for vertical adjustment of said sleeve, a collection plate rotatable around said center post and supported by said sleeve, burners mounted in said conduit system and in flow connection therewith beneath said collection plate, counter-balanced scrapers yieldably in contact with the bottom of said collection plate and means for transporting carbon black removed from said collection plate to a depository.

6. In a carbon black recovery device, a pair of sections formed in half circles and adapted to be joined into a circular framework, a housing around said framework, said framework being tubular and each section interconnected to form a conduit system, a gas supply line leading into said framework, means for selectively controlling the flow of air into said housing, a center post in said housing, a rotatable sleeve mounted on said center post, a collection plate supported by said sleeve, means for rotating said sleeve, burners mounted in said conduit system and in flow connection therewith beneath said collection plate, scrapers yieldably in contact with the bottom of said collection plate and means for transporting carbon black removed from said collection plate as said plate rotates over said scrapers to a depository.

7. In a carbon black recovery device, a tubular framework, said framework being interconnected to form a conduit system, a gas supply line leading into said framework, a gas inlet leading into said framework, a housing on said framework and a ventilator on said housing, means on the bottom of said housing for selectively controlling the flow of air into said housing, a center post in said housing, a rotatable sleeve on said center post, a plate supporting rim suspended from said center post, a collection plate loosely mounted on said sleeve and rim and rotatable therewith, burners on said framework and in flow connection therewith beneath said sleeve, a rotating drive shaft extending vertically through said housing, a pulley on said shaft in operative connection with said plate support for rotating said plate support, collection plate and center post, counter-balanced scrapers beneath said plate and in yieldable contact therewith, an auger housing beneath said scrapers having its upper end open to receive carbon black scraped from said collection plate and means for rotating said auger and removing said carbon black from said housing.

8. In a carbon black recovery device, a tubular framework, said framework being interconnected forming a conduit system, a gas inlet into said framework, a housing on said framework and a ventilator on said housing, means for controlling the flow of air into and out of said housing, a series of concentric annular conduits mounted on said framework and tubularly connected therewith, burners mounted on said annular conduits, an inclosure around each burner, said inclosure having its upper end open, ports in the side walls of said inclosure, a shield around said inclosure, ports in the side walls of said shield, said shield being rotatably adjustable to selectively determine the air flow through the ports of said shield and inclosure to said burner, a rotatable collection plate above said burners, parallel rows of scrapers beneath said collection plate and in yieldable contact therewith, means for receiving carbon black scraped from said collection plate by said scrapers and means for transporting said carbon black from said receiving means to a depository.

9. In a carbon black recovery device, a pair of frameworks, each framework being tubular and interconnected forming a gas conduit system, said framework being adaptable to joinder into a circular unit, a common gas inlet into said frameworks, a housing on said joined frameworks, dampers in the bottom of said housing and flues in the top of said housing for selectively controlling the flow of air into and out of said housing, a center post in said housing, a rotatable and vertically adjustable sleeve on said center post, a series of concentric conduits on said joined framework in flow connection therewith, burners mounted on said conduits, a collection plate supported by said center post and sleeve and positioned above said burners; scraper shafts mounted beneath said collection plate, scrapers pivotally mounted on said shafts having blades at one end in yieldable contact with said plate and counter weights mounted on the other end to maintain said blades in yieldable contact with said blade, collection means beneath said scrapers and means for simultaneously rotating said collection plate and actuating said collection means.

References Cited in the file of this patent
UNITED STATES PATENTS

| 176,478 | Neff | Apr. 25, 1876 |
| 277,472 | Falconer | May 15, 1883 |
| 668,045 | Houze et al. | Feb. 12, 1901 |
| 1,820,657 | Francis | Aug. 25, 1931 |
| 2,399,591 | Amon | Apr. 30, 1946 |